(12) United States Patent
Plona et al.

(10) Patent No.: US 7,290,769 B2
(45) Date of Patent: Nov. 6, 2007

(54) SEALING DEVICE WITH A BRUSH GASKET AND FLEXIBLE WASHER FOR A HIGH-PRESSURE TURBINE OF A TURBOMACHINE

(75) Inventors: Daniel Plona, Vulaines sur Seine (FR); Guy Dusserre-Telmon, Sivry-Courtry (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 11/028,232

(22) Filed: Jan. 4, 2005

(65) Prior Publication Data

US 2005/0151324 A1   Jul. 14, 2005

(30) Foreign Application Priority Data

Jan. 12, 2004   (FR) .................................. 04 00213

(51) Int. Cl.
 F16J 15/44 (2006.01)
 F01D 11/02 (2006.01)
 F01D 25/24 (2006.01)
(52) U.S. Cl. ...................... 277/355; 415/135; 415/138
(58) Field of Classification Search ................ 277/355; 415/135, 136, 138, 139, 174.2
 See application file for complete search history.

(56) References Cited

U.S. PATENT DOCUMENTS

| | | | |
|---|---|---|---|
| 4,781,388 A | 11/1988 | Woehrl et al. | |
| 5,174,582 A * | 12/1992 | Ferguson | .................... 277/355 |
| 5,265,412 A | 11/1993 | Bagepalli et al. | |
| 5,480,162 A | 1/1996 | Beeman, Jr. | |
| 5,568,931 A * | 10/1996 | Tseng et al. | ................ 277/355 |
| 5,688,105 A * | 11/1997 | Hoffelner | ................. 415/170.1 |
| 5,752,805 A * | 5/1998 | Gail et al. | .................. 415/229 |
| 5,794,938 A * | 8/1998 | Hofner et al. | .............. 277/355 |
| 6,059,526 A | 5/2000 | Mayr | |
| 6,109,616 A * | 8/2000 | Mayr | ........................ 277/355 |
| 6,170,831 B1 | 1/2001 | Bouchard | |
| 6,254,344 B1 * | 7/2001 | Wright et al. | ............... 415/231 |
| 6,293,553 B1 * | 9/2001 | Werner et al. | .............. 277/355 |
| 6,302,400 B1 * | 10/2001 | Werner et al. | .............. 277/355 |
| 6,352,263 B1 | 3/2002 | Gail et al. | |
| 6,681,486 B2 * | 1/2004 | Flower | ..................... 29/889.2 |

(Continued)

FOREIGN PATENT DOCUMENTS

EP   1 018 613 A2   7/2000

*Primary Examiner*—Robert Canfield
*Assistant Examiner*—Gay Ann Spahn
(74) *Attorney, Agent, or Firm*—Oblon, Spivak, McClelland, Maier & Neustadt, P.C.

(57) ABSTRACT

A sealing device for sealing between two static portions of a turbomachine includes a brush gasket formed by a plurality of resilient bristles which are, at least in part, held in a housing. Each bristle has a main portion and a secondary portion interconnected by a bent portion. The secondary portion has a free end ensuring leaktight contact with a surface that is to be sealed of the other static portion. The sealing device further includes a flexible washer of bent section which has a free end bearing both against the free ends of the secondary portions of the bristles of the brush gasket, and against the surface that is to be sealed so that the free ends of the secondary portions of the bristles of the brush gasket are permanently in contact with the surface that is to be sealed.

23 Claims, 1 Drawing Sheet

U.S. PATENT DOCUMENTS

| | | |
|---|---|---|
| 6,685,427 B1 * | 2/2004 | Dhar et al. ............... 415/173.3 |
| 6,695,314 B1 * | 2/2004 | Gail et al. ................... 277/355 |
| 6,779,799 B2 * | 8/2004 | Tong et al. ................. 277/411 |
| 6,799,766 B2 * | 10/2004 | Crudgington et al. ....... 277/355 |
| 6,840,518 B2 * | 1/2005 | Boston ........................ 277/355 |
| 2001/0030397 A1 * | 10/2001 | Beichl ......................... 277/355 |
| 2002/0020968 A1 * | 2/2002 | Gail et al. ................... 277/355 |
| 2002/0140175 A1 * | 10/2002 | Kono .......................... 277/355 |
| 2003/0085525 A1 * | 5/2003 | Boston ........................ 277/355 |
| 2003/0141666 A1 * | 7/2003 | Crudgington et al. ....... 277/355 |
| 2005/0040602 A1 * | 2/2005 | Beichl et al. ................ 277/355 |
| 2005/0116423 A1 * | 6/2005 | Beichl et al. ................ 277/355 |
| 2005/0146095 A1 * | 7/2005 | Gebert ........................ 277/355 |
| 2006/0055118 A1 * | 3/2006 | Beichl ......................... 277/346 |

* cited by examiner

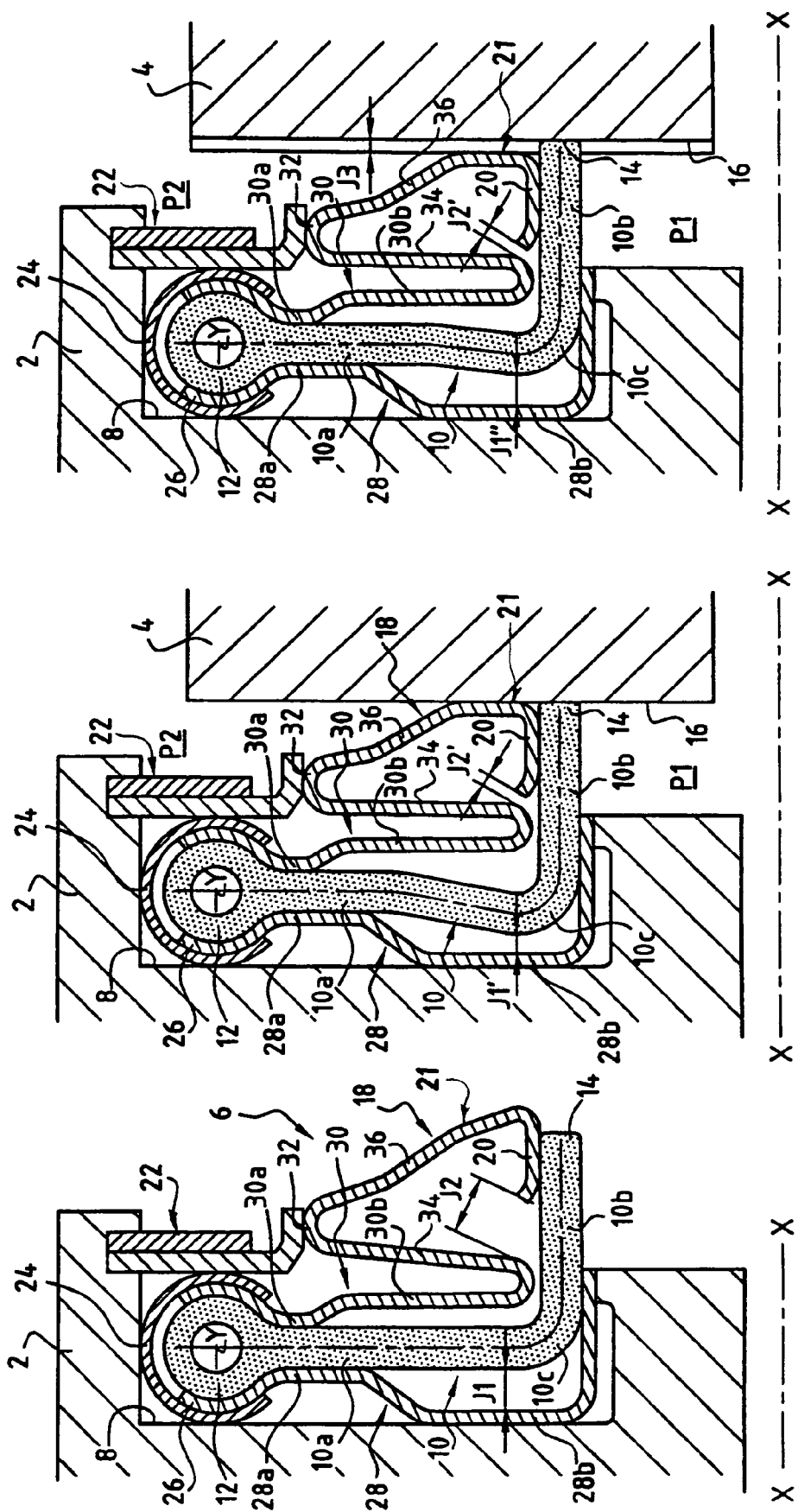

SEALING DEVICE WITH A BRUSH GASKET AND FLEXIBLE WASHER FOR A HIGH-PRESSURE TURBINE OF A TURBOMACHINE

BACKGROUND OF THE INVENTION

The present invention refers to the general field of sealing devices designed to reduce the flow sections between different cavities of a turbomachine, e.g. in the high-pressure turbine of a turbomachine.

In the hot portions of a turbomachine, sealing devices are subjected to considerable variations in clearance arising from general relative movements of casings, and from thermal distortions. In particular, when one of the portions of the turbomachine to be sealed is sectorised, as is the case in particular for the stator stages of the high-pressure turbine, the bearing zone of the sealing device is discontinuous, and sealing gaskets that are not sectorised become ineffective.

Different types of gaskets exist for sealing of the hot portions of a turbomachine. For example, so-called brush gaskets are known through U.S. Pat. Nos. 4,781,388, 5,480,162 and 6,170,831, said gaskets consisting of a plurality of bristles or wires, e.g. made of metal, which are crimped or welded and held, at one of their ends in a housing, while their free ends are in contact with the surface of the portion of the turbomachine that is to be sealed. Such brush joints are thus able to adapt to the variations in clearance to which the sealing devices are subjected. By construction, the bristles of a brush gasket adapt to the deformed or discontinuous surfaces of the portion that is to be sealed.

In static applications where the relative displacements of the zone that is to be sealed are small, it is known to make brush gaskets having bristles that present a disposition that is radial or axial. However, when relative movements are large, it is advantageous to be able to have recourse to an intermediate arrangement in which the bristles of the brush gasket are bent, as in U.S. Pat. No. 6,059,526, since that enables the bristles to be made to flex over a considerable length.

Nevertheless, the brush gasket presents certain drawbacks for static applications. Overall permeability of the bristles which constitute said gasket is too high to enable really effective sealing to be achieved. This observation is particularly true for those metal bristles which must have a diameter of more than 75 micrometers ($\mu m$) for the bristles to retain acceptable mechanical properties, as a function of the pressure differences to which said bristles are subjected.

Likewise, bent brush gaskets are not completely satisfactory. In particular, their overall permeability is always too high to guarantee perfect sealing of the zone that is to be sealed. Moreover, when the surface that is to be sealed presents discontinuities and/or deformations due, in particular, to relative radial and/or axial movements between the portions of the zone of the turbomachine that are to be sealed, bent brush gaskets do not fit closely over various geometrical roughnesses, which leads to large leakage areas under the brushes.

OBJECTS AND SUMMARY OF THE INVENTION

Therefore, the present invention seeks to remedy such drawbacks by providing a sealing device that has comparatively low overall permeability, and that can adapt to the discontinuities and/or the deformations of the surface that is to be sealed.

For this purpose, the invention provides a sealing device for sealing between two static portions of a turbomachine in order to separate two spaces of different pressures, said sealing device comprising a brush gasket formed by a plurality of resilient sealing bristles which are, at least in part, held in a housing in one of said static portions, each bristle having a main portion and a secondary portion interconnected by a bent portion, said main portions of the bristles being, at least in part, held in said housing in one of said static portions, each said secondary portions of the bristles having respective free ends that project towards the outside of said housing in order to ensure leaktight contact with a surface that is to be sealed of the other static portion, said sealing device further comprising a flexible washer with a bent section which covers, at least in part, the main portions of the bristles of the brush gasket and which has a free end bearing both against the free ends of the secondary portions of the bristles of the brush gasket, and against said surface that is to be sealed so that said free ends of the secondary portions of the bristles of the brush gasket are permanently in contact with said surface that is to be sealed.

The portion of the flexible washer which bears against the free end of the brush gasket enables said free ends of the bristles to be held permanently in contact with the surface that is to be sealed. Moreover, the portion of the washer which bears against the surface that is to be sealed increases overall sealing of the sealing device. Since said washer is flexible, it also enables relative radial and/or axial movements between the static portions to be compensated so that the sealing device fits closely over the various geometrical roughnesses of the surface that is to be sealed.

According to an advantageous characteristic of the invention, the flexible washer has a bent section of substantially omega ($\omega$) shape.

According to another advantageous characteristic of the invention, the free end of the flexible washer, which bears against the free ends of the secondary portions of the bristles of the brush gasket, and against the surface that is to be sealed, is disposed on the side of the space that has the lower pressure.

According to yet another advantageous characteristic of the invention, the sealing device also includes a retaining ring for retaining the main portions of the bristles of the brush gasket that are in the housing of the static portion.

BRIEF DESCRIPTION OF THE DRAWINGS

Other features and advantages of the present invention appear from the following description, given in reference to the accompanying drawings which show a non-limiting embodiment thereof. In the figures:

FIG. 1 is an axial section of a sealing device of the invention, said device being held in a housing in a static portion of a turbomachine;

FIG. 2 is an axial section which shows a zone of a turbomachine that is provided with the sealing device of FIG. 2; and FIG. 3 shows deformation of the sealing device of FIG. 1 when the surface that is to be sealed presents a discontinuity.

DETAILED DESCRIPTION OF AN EMBODIMENT

FIGS. 1 to 3 are axial sections which show a sealing device constituting an embodiment of the invention. In these figures, references 2 and 4 designate, respectively, a first static portion, and a second static portion, of a turbomachine of longitudinal axis X-X. By way of example, said two static portions 2, 4 may be elements in a high-pressure turbine of the turbomachine. The term "static" indicates that said two portions are considered to be stationary in that they are not subject to a rotational movement, but that they may, nonetheless, be subject to relative radial and/or axial movements.

The sealing device 6 is disposed in a housing in the first static portion 2 of the turbomachine. Alternatively, the sealing device could be positioned in a housing in the second static portion 4. Said device 6 ensures leaktightness between two spaces P1 and P2 of the turbomachine, pressure in the space P2 being, for example, lower than pressure in the space P1.

In particular, the sealing device 6 is made up of a brush gasket 10 formed by a plurality of bristles or wires. The bristles may be made from a winding of metal or composite fibers. Said bristles are conventionally secured at one end 12 of each bristle, around an axis Y, e.g. by welding. The other end 14 of each bristle is free, and in leaktight contact with a surface that is to be sealed 16 of the second static portion 4 of the turbomachine.

More precisely, each bristle of the brush gasket 10 made in this way presents a main portion 10a and a secondary portion 10b, which portions are connected to each other by a bent portion 10c. The bristles of the main portion 10a are held, at least in part, in the housing 8 of the first static portion 2 of the turbomachine, and the bristles of the secondary portion 10b project outwardly from said housing, so that, at the free end 14 of each bristle, said bristles ensure leaktight contact with the surface that is to be sealed.

In the invention, the sealing device 6 also includes a flexible washer 18, made of metal, for example, with a curved section which covers, at least in part, the main portions 10a of the bristles of the brush gasket 10, and which flexible washer has a free end 20 that bears both against the free ends 14 of the secondary portions 10b of the bristles of the brush gasket 10 and against the surface that is to be sealed 16. The portion 21 of the flexible washer 18 protrudes outwardly from the housing as shown in FIGS. 1-3.

Hence, the free end 20 of the washer 18 ensures that the free ends 14 of the secondary portions 10b of the bristles are permanently in contact with the surface that is to be sealed 16. Moreover, since the free end 20 of the washer 18 bears against the surface that is to be sealed 16, said free end increases overall sealing of the sealing device 6.

Preferably, a retaining ring 22 is designed to hold the main portions 10a of the bristles of the brush gasket 10 in the housing 8 of the first static portion 2. Said retaining ring 22 is fastened to one of the walls of the housing 8 of the first static portion 2. A C-shaped hoop 24 may also be provided, said hoop surrounding, at least in part, the secured ends 12 of the bristles of the brush gasket 10, said hoop being held in the housing 8 by the retaining ring 22.

According to an advantageous characteristic of the invention, the flexible washer 18 has a right section that is substantially omega (ω) shaped. A first lobe 26 of the omega surrounds, at least in part, the secured ends 12 of the bristles of the brush gasket 10.

Towards the inside of the housing 8, the first lobe 26 is extended by a first arm 28 having a portion 28a that fits closely to the outside edges of the main portions 10a of the bristles of the brush gasket 10. In order to allow a certain amount of axial flexion by the bristles of the brush gasket 10 when the sealing device 6 encounters an axial discontinuity by the surface that is to be sealed 16, another portion 28b of the first arm 28 that is not in contact with the main portions 10a of the bristles of the brush gasket 10 leaves back clearance J1 behind said portions of the bristles.

Towards the outside of the housing 8, the first lobe 26 is extended by a second arm 30, having a portion 30a that is also a close fit to the outside edges of the main portions 10a of the bristles of the brush gasket 10. In addition, still in order to allow a certain amount of axial flexion by the bristles, another portion 30b of the second arm 30 is not in contact with the main portions 10a of the bristles of the brush gasket 10.

The flexible, omega-shaped washer 18 presents a second lobe 32. Said second lobe 32 bears radially against the retaining ring 22 fastened to the housing 8 in the first static portions 2. Towards the inside of the housing 8, the second lobe 32 is extended by a third arm 34 which is connected to the second arm 30. Towards the outside of the housing 8, the second lobe 32 is extended by a fourth arm 36 having a free end 20 that bears both against the free ends 14 of the secondary portions 10b of the bristles of the brush gasket 10, and against the surface that is to be sealed 16. Moreover, front clearance J2 is provided between said free end 20 and the third arm 34.

According to another advantageous characteristic, said free end 20 of the flexible washer 18 (which is also the free end of the fourth arm 36) is disposed beside the space P2 that has the lower pressure.

Thus, the flexible washer 18, and more particularly its free end 20, prevents the free ends 14 of the secondary portions 10b of the bristles of the brush gasket 10 from flexing radially towards the space P2 under the effect of the pressure difference between the space P1 and the space P2. Such radial flexion by the free ends of the bristles of the brush gasket would result in the bristles of the brush gasket becoming "unstuck", since they would no longer be in contact with the surface that is to be sealed, thereby increasing the overall permeability of the sealing device.

According to yet another advantageous characteristic of the invention, the bent portions 10c of the bristles of the brush gasket 10 are right angled so that the secondary portions 10b of the bristles of the brush gasket extend substantially perpendicularly to the main portions 10a of the bristles of the brush gasket.

Still advantageously, the brush gasket 10 is disposed so that the main portions 10a of the bristles extend substantially perpendicularly to a longitudinal axis X-X of the turbomachine, and so that the secondary portions 10b of the bristles extend substantially parallel to this same longitudinal axis X-X.

A brief description of the operation of the sealing device of the invention is given below, which operation stems logically from the above description.

FIG. 1 shows the sealing device 6 when said device is in the free state, i.e. when the second static portions of the turbomachine is not in place. In this configuration, the free end 20 of the flexible washer 18 bears firmly against the free ends 14 of the secondary portions 10b of the bristles of the brush gasket 10. Moreover, the free end 20 of the washer 18 protrudes axially a little relative to the free ends 14 of the secondary portions 10b of the bristles.

When the second static portion 4 of the turbomachine is pressed axially against the first static portion 2 (configuration in normal use—FIG. 2), the flexible washer 18, and in particular its fourth arm 36, is deformed axially so that the front clearance J2' is smaller than in the configuration when the sealing device is in its free state (J2'<J2).

Likewise, the main portions 10a of the bristles of the brush gasket 10 are deformed axially towards the inside of the housing 8, thereby decreasing the back clearance J1' (J1'<J1). It should be observed that the flexible washer 18 bears firmly against the surface that is to be sealed 16 at its free end 20, which increases the overall sealing of the device 6.

Moreover, since the washer 18 bears against the surface that is to be sealed 16, it is possible to hold the sealing device 6 in contact with the surface that is to be sealed 16, in particular, when said surface presents discontinuity and/or deformations. This configuration is shown in FIG. 3.

In FIG. 3, the sealing device 6 encounters an axial discontinuity on the surface that is to be sealed 16, said discontinuity being represented by clearance J3. Such a discontinuity J3 may be the result of a relative axial movement between the first static portion 2 and the second static portion 4 of the turbomachine. It may also be triggered by considerable thermal deformation in either of said static portions 2, 4.

In this situation, the free ends 14 of the bristles of the brush gasket 10 remain firmly in leaktight contact with the surface that is to be sealed 16. This is possible due to the flexibility of the bristles of the brush gasket which, at their main portions 10a, become slightly deformed towards the outside of the housing 8 relative to their configuration in normal use (FIG. 2). Thus, the back clearance J1" increases once more relative to the configuration in normal use (J1">J1').

The fact that the washer 18 is flexible enables the sealing device 6 to resume its normal use position (FIG. 2) once the axial discontinuity of the surface that is to be sealed 16 has disappeared. Once the axial discontinuity has disappeared the bristles of the main portion 10a of the brush gasket 10 return elastically to their initial shape (FIG. 2).

As a result, the sealing device 6 of the invention fits closely to the various deformations and/or discontinuities it might encounter on the surface that is to be sealed 16 may encounter. The free ends 14 of the bristles of the brush gasket 10 are constantly in contact with the surface that is to be sealed in order to ensure good sealing between the two static portions of the turbomachine.

What is claimed is:

1. A sealing arrangement for a turbomachine comprising:
a static portion including a cavity defining a housing;
a sealing device including a brush gasket formed by a plurality of resilient sealing bristles, the brush gasket having a main portion and a secondary portion having a free end section, the brush gasket further including a bent portion interconnecting the main portion of the brush gasket to the secondary portion of the brush gasket, the main portion of the brush gasket being secured in said housing of said static portion, said free end section of the brush gasket extending outside said housing of said static portion in a free state configuration where said resilient sealing bristles are not axially deformed; and
a flexible washer having a curved section and an end portion, said curved section covering a portion of the main portion of the brush gasket and said end portion of said flexible washer bearing against the free end section of the brush gasket and, in said free state configuration where said resilient sealing bristles are not axially deformed, extending beyond said free end section of the brush gasket outside and away from said housing of said static portion.

2. A sealing arrangement for a turbomachine comprising:
a first static portion including a cavity defining a housing;
a second static portion, stationary with respect to the first static portion except subject to relative radial and axial movement with respect to a longitudinal axis of the turbomachine, spaced from said first static portion by a first space in a normal use position, said second static portion including a surface opposite to the cavity of said first static portion; and
a sealing device for sealing the first space between the first static portion and the second static portion in order to divide the first space into second and third spaces, the second space having a different pressure from a pressure in the third space;
said sealing device including:
a brush gasket formed by a plurality of resilient sealing bristles, the brush gasket having a main portion and a secondary portion, the secondary portion having a free end section, the brush gasket further including a bent portion interconnecting the main portion of the brush gasket to the secondary portion of the brush gasket, the main portion of the brush gasket being secured in said housing of said first static portion, said secondary portion of the brush gasket projects outside of said housing of said first static portion in a first direction so that the free end section of the brush gasket engages said surface of the second static portion; and
a flexible washer having a curved section and an end portion, said curved section covering a portion of the main portion of the brush gasket and said end portion of said flexible washer bearing against the free end section of the brush gasket and, the flexible washer further including a protruding portion connected to the end portion and bearing against said surface of the second static portion in said normal use position so that said free end section of the brush gasket is permanently in contact with said surface of the second static portion in said normal use position,
wherein, the free end section of the brush gasket is deflected in a second direction, opposite the first direction, by engagement with said surface of the second static portion by a first distance, and
the protruding portion of said flexible washer is deflected in the second direction by engagement with said surface of the second static portion by a second distance that is greater than the first distance.

3. A sealing arrangement according to claim 2, wherein the flexible washer is substantially ω-shaped.

4. A sealing arrangement according to claim 2, wherein said sealing device separates a higher pressure space from a lower pressure space and the higher pressure space is the second space, the lower pressure space is the third space, and the end portion of the flexible washer is exposed to the pressure in the lower pressure space.

5. A sealing arrangement according to claim 2, further comprising a retaining ring for retaining the main portion of the brush gasket in the housing of the first static portion.

6. A sealing arrangement according to claim 5, wherein the curved section of the flexible washer comprises a first lobe and a second lobe, said first lobe being inside said housing and said second lobe being at least partially outside said housing.

7. A sealing arrangement according to claim 6, wherein said second lobe bears against the retaining ring.

8. A sealing arrangement according to claim 5, wherein the flexible washer is between said main portion of the brush gasket and said surface of the second static portion, and also between said secondary portion of the brush gasket and said retaining ring.

9. A sealing arrangement according to claim 2, wherein the bent portion of the brush gasket is right angled so that the secondary portion of the brush gasket extends substantially perpendicularly to the main portion of the brush gasket.

10. A sealing arrangement according to claim 2, wherein the brush gasket is disposed so that the main portion of the brush gasket extends substantially perpendicularly to a longitudinal axis of the turbomachine, and so that the secondary portion of the brush gasket extends substantially parallel to said longitudinal axis of the turbomachine.

11. A sealing arrangement according to claim 2, wherein the curved section of the flexible washer comprises a first lobe and a second lobe, said first lobe being inside said housing and said second lobe being at least partially outside said housing.

12. A sealing arrangement according to claim 11, wherein said first lobe includes a first arm inside said housing, said first arm having a first portion in contact with said main portion of the brush gasket.

13. A sealing arrangement according to claim 12, wherein said first arm of said first lobe has a second portion not in contact with said main portion of the brush gasket.

14. A sealing arrangement according to claim 13, wherein said second portion of said first arm of said first lobe contacts a wall of said housing of the first static portion.

15. A sealing arrangement according to claim 14, wherein said first lobe includes a second arm having a first portion in contact with said main portion of the brush gasket.

16. A sealing arrangement according to claim 15, wherein said second arm of said first lobe has a second portion not in contact with said main portion of the brush gasket.

17. A sealing arrangement according to claim 12, wherein said first lobe includes a second arm having a first portion in contact with said main portion of the brush gasket.

18. A sealing arrangement according to claim 17, wherein said second arm of said first lobe has a second portion not in contact with said main portion of the brush gasket.

19. A sealing arrangement according to claim 17, wherein said second lobe includes a third arm connected to said second arm of the first lobe.

20. A sealing arrangement according to claim 19, wherein said second lobe includes a fourth arm connected to the end portion of the flexible washer.

21. A sealing arrangement according to claim 20, wherein said end portion of the flexible washer and said third arm are separated by a clearance.

22. A sealing arrangement according to claim 2, wherein part of the flexible washer is positioned within an area partially bounded by said main portion of the brush gasket, said surface of the second static portion and said secondary portion of the brush gasket.

23. A sealing arrangement comprising:
a first static portion including a cavity defining a housing;
a second static portion, stationary with respect to the first static portion except subject to relative radial and axial movement with respect to a longitudinal axis of the turbomachine, spaced from said first static portion by a first space in a normal use position, said second static portion including a surface opposite to the cavity of said first static portion; and
a sealing device for sealing the first space between the first static portion and the second static portion in order to divide the first space into second and third spaces, the second space having a different pressure from a pressure in the third space;
said sealing device including:
a brush gasket formed by a plurality of resilient sealing bristles, the brush gasket having a main portion and a secondary portion, the secondary portion having a free end section, the brush gasket further including a bent portion interconnecting the main portion of the brush gasket to the secondary portion of the brush gasket, the main portion of the brush gasket being secured in said housing of said first static portion, said secondary portion of the brush gasket projects outside of said housing of said first static portion in a first direction so that the free end section of the brush gasket engages said surface of the second static portion; and
a flexible washer having a curved section and an end portion, said curved section covering a portion of the main portion of the brush gasket and said end portion of said flexible washer bearing against the free end section of the brush gasket and, the flexible washer further including a protruding portion connected to the end portion and bearing against said surface of the second static portion in said normal use position so that said free end section of the brush gasket is permanently in contact with said surface of the second static portion in said normal use position,
wherein, the free end section of the brush gasket is deflected in a second direction, opposite the first direction, by engagement with said surface of the second static portion by a first distance, and
the protruding portion of said flexible washer is deflected in the second direction by engagement with said surface of the second static portion by a second distance that is greater than the first distance.

* * * * *